(12) United States Patent
Tsurumi

(10) Patent No.: US 7,901,316 B2
(45) Date of Patent: *Mar. 8, 2011

(54) OSCILLATING INNER GEARING PLANETARY GEAR SYSTEM

(75) Inventor: Yo Tsurumi, Aichi (JP)

(73) Assignee: Sumitomo Heavy Industries, Ltd., Shinagawa-Ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/385,025

(22) Filed: Mar. 30, 2009

(65) Prior Publication Data

US 2009/0192004 A1   Jul. 30, 2009

Related U.S. Application Data

(63) Continuation of application No. 10/809,935, filed on Mar. 26, 2004, now Pat. No. 7,534,184.

(30) Foreign Application Priority Data

Mar. 26, 2003   (JP) ................................ 2003-085779

(51) Int. Cl.
   *F16H 1/32* (2006.01)
(52) U.S. Cl. .......................................... 475/162; 475/178
(58) Field of Classification Search .................. 475/162, 475/163, 164, 176, 177, 178, 179
   See application file for complete search history.

(56) References Cited

U.S. PATENT DOCUMENTS

| | | | |
|---|---|---|---|
| 4,846,018 A | 7/1989 | Matsumoto et al. | |
| 6,679,801 B2* | 1/2004 | Nohara et al. | 475/179 |
| 6,699,152 B2 | 3/2004 | Tanaka | |
| 7,534,184 B2* | 5/2009 | Tsurumi | 475/162 |

FOREIGN PATENT DOCUMENTS

| | | |
|---|---|---|
| EP | 1 978 282 A1 | 10/2008 |
| JP | 62233540 A | 10/1987 |
| JP | 64-38352 | 3/1989 |
| JP | 1-96551 | 6/1989 |
| JP | 02-107846 | 4/1990 |
| JP | 2561227 | 9/1996 |
| JP | 2000-65158 | 3/2000 |
| JP | 2000-232755 | 8/2000 |
| WO | WO 2007/086476 A1 | 8/2007 |
| WO | WO 2007/125835 A1 | 11/2007 |

* cited by examiner

*Primary Examiner* — Roger Pang
(74) *Attorney, Agent, or Firm* — Squire, Sanders & Dempsey (US) LLP

(57) ABSTRACT

An oscillating inner gearing planetary gear system is provided which does not need to occupy a large space even in a state where a driving source is joined. In particular, the axial length thereof can be shortened, and a large diameter hollow shaft therethrough can be formed. The oscillating inner gearing planetary gear system (100) is configured in such a manner that rotation of an input shaft (104) is reduced by internal oscillating bodies (116A,116B) oscillatingly rotating relative to an external gear (118), and the reduced output is delivered by the external gear (118) also serving as an output shaft. A middle shaft (108) is located parallel to the external gear (118) at a position more radially outward than the internal oscillating bodies (116A,116B). An orthogonal gearset (106) connects the middle shaft (108) and the input shaft (104) at a right angle. Power from the input shaft (104) is inputted from a direction radially outward of the internal oscillating bodies (116A,116B) through the middle shaft (108).

6 Claims, 7 Drawing Sheets

(A)

(B)

OSCILLATING INNER GEARING PLANETARY GEAR SYSTEM

CROSS-REFERENCE TO RELATED APPLICATIONS

This application is a Continuation Application under 35 U.S.C. §120 of U.S. Nonprovisional patent application Ser. No. 10/809,935, filed on Mar. 26, 2004. The subject matter of this earlier filed application is hereby incorporated by reference in its entirety.

BACKGROUND OF THE INVENTION

1. Field of the Invention

The present invention relates to an oscillating inner gearing planetary gear system and a geared motor having the same.

2. Description of the Related Art

An oscillating inner gearing planetary gear system has an external gear and internal gears which have a slight difference in the number of teeth with the external gear. Rotation speed of an input shaft is reduced by one of either the external gear or the internal gears oscillating with respect to the other, and the speed-reduced output is delivered by an output shaft. This type of system is found in various areas in which reducers are used, owing to the advantages of large torque transmission being possible and large reduction ratios being obtainable.

For example, Japanese Patent No. 2607937 discloses an internal oscillating inner gearing planetary gear system in which rotation of an input shaft is reduced and delivered by an output member through oscillatingly rotating internal gears around an external gear. The internal gear has a slight difference in the number of teeth with the external gear.

An example of the same gear system will now be explained with reference to FIGS. 6 and 7.

In the FIGS. 6 and 7, a casing 1 has a first support block 1A and a second support block 1B joined together by insertion of an engaging member such as bolts or pins (omitted in drawings) into engaging holes 2. A pinion 6 is disposed on the end of an input shaft 5. The pinion 6 meshes with a plurality of transmitting gears 7 disposed at equal angles around the input shaft 5.

Three eccentric shafts 10 are disposed in the casing 1 at equal-angled intervals (120 degree intervals) circumferentially. The eccentric shafts 10 are supported to be freely rotatable by bearings 8 and 9 at both axial ends and have eccentric bodies 10A and 10B which are in an axially midway portion thereof. The transmitting gears 7 are joined to respective end portions of the eccentric shafts 10. The transmitting gears 7 are rotated by the rotation of the input shaft 5, to rotate each of the eccentric shafts 10.

The eccentric shafts 10 pass through eccentric holes 11A and 11B of two internal oscillating bodies 12A and 12B contained in the casing 1, respectively. Rollers 14A and 14B are disposed between outer circumferences of the two eccentric bodies 10A and 10B adjoined in the axial direction of the eccentric shafts 10 and inner circumferences of the through-holes of the internal oscillating bodies 12A and 12B, respectively.

An external gear 21 integrated with the end of an output shaft 20 is disposed at the central portion inside the casing 1. Internal teeth 13 formed from pins of the internal oscillating bodies 12A and 12B mesh with external teeth 23 of the external gear 21. A difference in the number of teeth between the external teeth 23 of the external gear 21 and the internal teeth 13 of the internal oscillating bodies 12A and 12B is set to be slight (for example, in a range of about 1 to 4).

The gear system operates in the following manner. Rotation of the input shaft 5 is delivered to the transmitting gears 7 through the pinion 6. The eccentric shafts 10 are then rotated by the transmitting gears 7. The eccentric bodies 10A and 10B rotate due to rotation of the eccentric shafts 10, then, the internal oscillating bodies 12A and 12B oscillatingly rotate due to the rotation of the eccentric bodies 10A and 10B. With this arrangement, through one rotation of the oscillating rotation of the internal oscillating bodies 12A and 12B, a phase of the external gear 21 which meshes with the internal oscillating bodies 12A and 12B is shifted by the difference in the number of teeth. Thus, a rotation component equivalent to the phase difference becomes the (reduction) rotation of the external gear 21, and speed-reduced output is delivered from the output shaft 20.

Moreover, as this kind of oscillating inner gearing planetary gear systems, in addition to the discussed internal teeth oscillating type in which internal oscillating bodies are oscillated, external teeth oscillating types in which an external gear is oscillated are also known and widely used.

Among the types wherein an external gear is oscillated, there are types where an eccentric body for oscillatingly rotating the external gear is disposed at the outer circumference of an input shaft (coaxially with the input shaft axle), as well as types where a plurality of eccentric shafts are provided passing through an external gear, rotation of the input shaft is distributed and transmitted to the plurality of eccentric shafts, and all eccentric shafts are rotated in phase (for example, U.S. Pat. No. 4,846,018).

However, in these known gear systems, when a driving source (such as a motor) is connected to the input shaft, a large space (space to accommodate the system) is occupied both radially and axially, given that the axial direction length is long since an input shaft is located coaxially with an output shaft, and the gear system itself has a considerable radial dimension to begin with. As a result, installation to a partnered apparatus (driven apparatus) was sometimes difficult depending on the application, installation conditions, or other aspects. There was also a problem that a large volume is required per single unit when storing as stock or transporting in the form of a geared motor.

Also, when attempts were made at a design having a hollow shaft passing through the entire gear system, a construction where the axis of a driving source is offset from the axis of the input shaft (by insertion of an idler gear or similar means) came to be employed, since it was difficult to design a driving source such as a motor connected with the input shaft, with a through-hole as well. However, with this arrangement, a new problem arose of the axial length becoming even longer, since it is necessary to insert an idler gear for offsetting the axis.

Even if a hollow shaft were to be adopted, it would mean forming a space inside an input shaft rotating at high speed, and thus, for example, to locate wire harnesses, cooling water piping, etc. in the space, it would be necessary to install protective piping which would be held so as not to rotate by separate bearings disposed between the protective piping itself and the inner circumference of the input shaft. In this respect as well problems arose of difficulty in maintaining a large enough space, as well as an increase in cost.

SUMMARY OF THE INVENTION

The present invention was devised to solve these problems in the related art. It is an object of the present invention to provide an oscillating inner gearing planetary gear system and a geared motor having the same which do not need to occupy a large space even in a state of being connected to a driving source. Particularly, the axial length thereof can be shortened. At the same time, a large diameter hollow shaft that passes through the entire gear system can be formed without hindrance and difficulty.

The present invention provides an oscillating inner gearing planetary gear system comprising: an internal gear; an external gear which meshes with the internal gear; an eccentric body which oscillatingly rotates either the internal gear or the external gear; an input shaft; a middle shaft which has an orthogonal gear, the orthogonal gear linking the middle shaft to the input shaft at a right angle; wherein either the internal gear or external gear is oscillatingly rotated via the input shaft, the orthogonal gear, the middle shaft, and the eccentric body. Thereby the above-mentioned problems are solved.

According to the present invention, the input shaft of the gear system (or the output shaft of the driving source) can be located in a right angle direction to the output shaft (member). Therefore, even when forming a through-hole in the center of a gear system, it is not necessary to make a hollow shaft through an input shaft, a driving source, etc. A large-diameter hollow shaft can thus be easily formed. Particularly, since not only a driving source but also an input shaft (rotating at high speed) does not need to have a hollow structure, rotational speed of the inner wall of the space formed in the center of a gear system can be very slow, and it is unnecessary to locate separate protective piping or other similar features. Therefore, more space can be made available at lower cost.

Further, according to the structure of the present invention, since a driving source itself does not exist on the side opposite to a partnered apparatus of a gear system, the axial length of an entire system including a driving source can be largely shortened. In this regard, the present invention is beneficial, when compared to constructions of the related art wherein a driving source is simply located at a right angle to an input shaft so that the axial length is shortened by the lengthwise and breadthwise dimensional difference of the driving source. Also, since there is little waste of occupied space when a driving source is integrated therewith, the volume taken up per single unit as stock or during transporting can be reduced.

Further, as will be later explained, the present invention can be applied to an inner gearing planetary gear system of either an internal oscillating type or an external oscillating type.

It may be preferable that a structure be adopted for the present invention wherein the output shaft (member) is a hollow shaft passing axially through the entire oscillating inner gearing planetary gear system. A hollow shaft structure having a large diameter can thereby be realized.

DETAILED DESCRIPTION OF THE PREFERRED EMBODIMENTS

With reference to the drawings, an embodiment of the present invention will be described.

Figure 1:
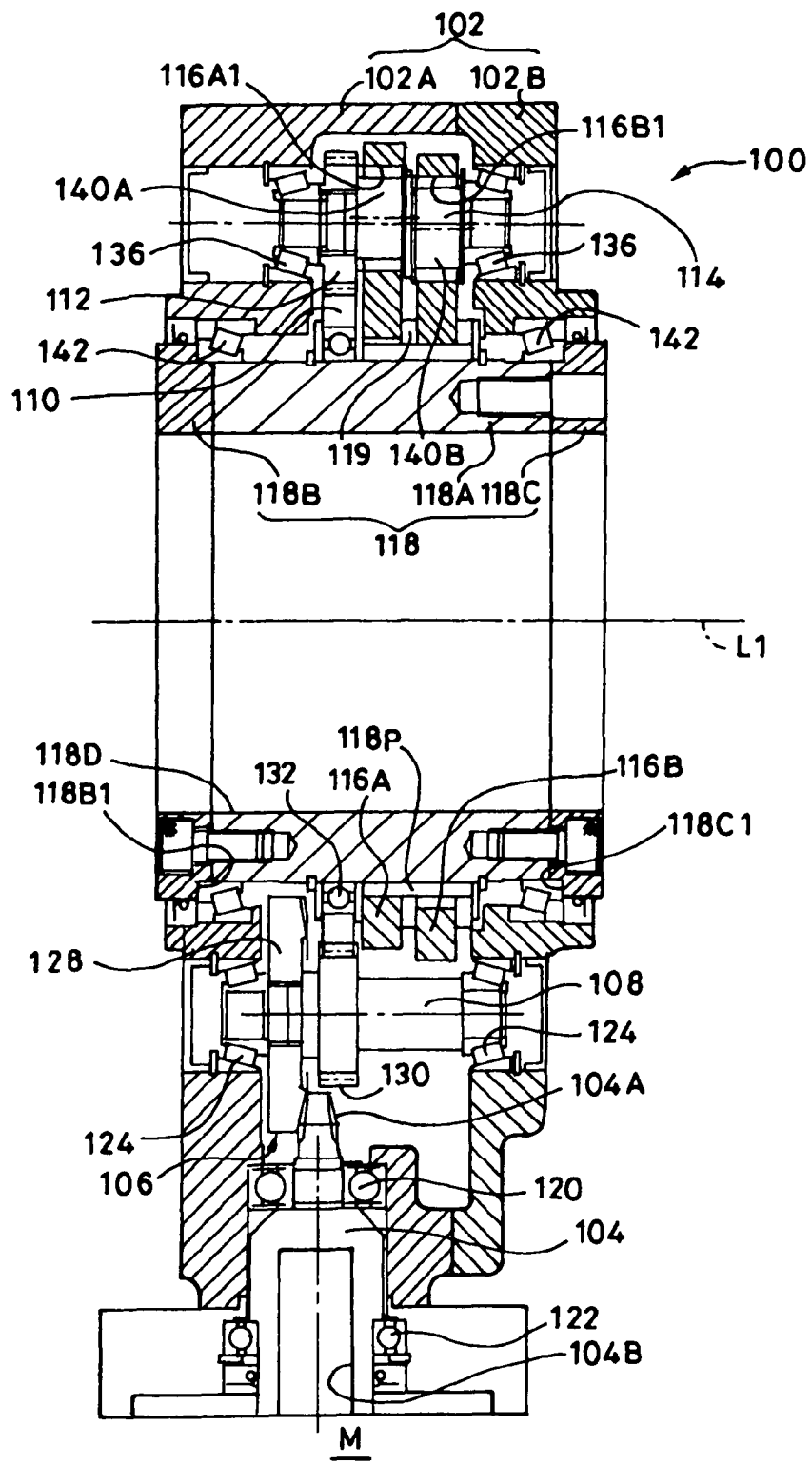
FIG. 1 is a lateral cross-sectional view showing an internal oscillating inner gearing planetary gear system according to an embodiment of the present invention.

FIG. 1 shows an oscillating inner gearing type planetary gear system 100 according to an embodiment of the present invention.

The planetary gear system 100 mainly comprises a main body casing 102, an input shaft 104, an orthogonal gearset 106, a middle shaft 108 which will be later discussed, a transmitting external gear 110, eccentric shaft driving gears 112, three eccentric shafts 114 (114A through 114C) driven by the eccentric shaft driving gears 112, two internal oscillating bodies (internal gears) 116A and 116B, and an external gear 118 also serving as an output shaft.

Specifically, the planetary gear system 100 comprises the plurality of (three in the present embodiment) eccentric shafts 114 passing through the internal oscillating bodies 116A and 116B for oscillatingly rotating the internal oscillating bodies 116A and 116B, and causes all of the eccentric shafts 114A through 114C to rotate in phase by distributing and transmitting rotation of the input shaft 104 to the plurality of eccentric shafts 114A through 114C.

Differing greatly from the example of the prior art is the casing structure of the entire gear system and the power transmission structure from the input shaft 104 to as far as the eccentric shafts 114A through 114C. These points will now be discussed in detail.

Figure 2:
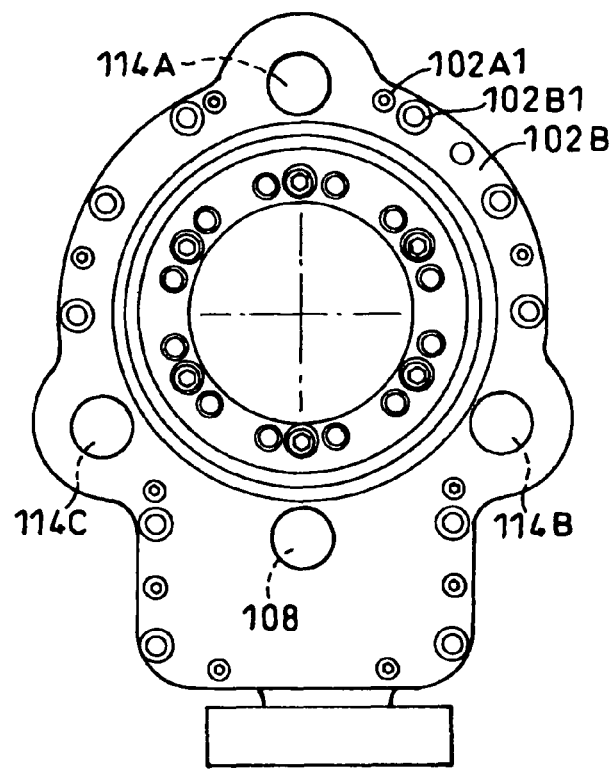
FIG. 2A is a side view from the right side of FIG. 1, FIG. 2B being a side view corresponding to FIG. 2A showing an example of a motor installed from a different angle.
Figure 2:
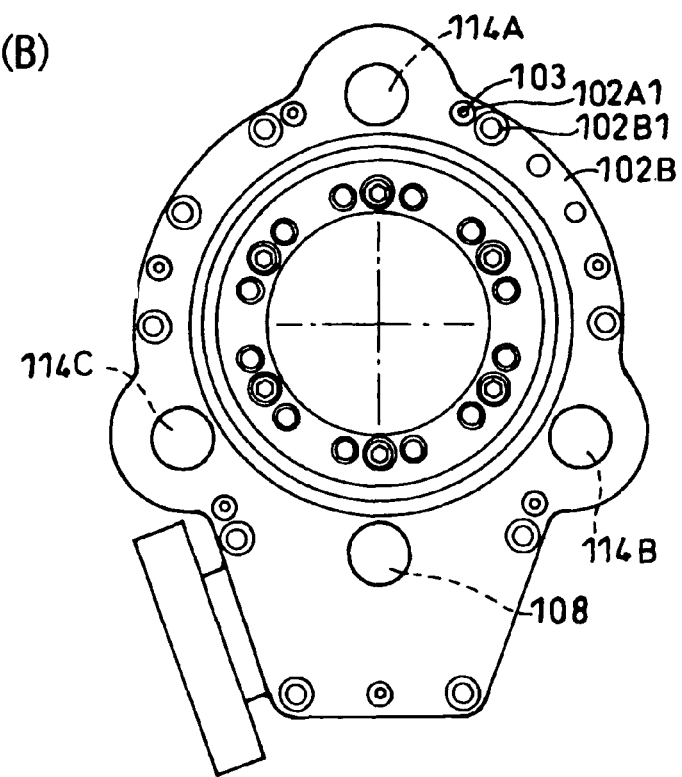

The main body casing 102 comprises a first casing 102A and a second casing 102B located on the left and right respectively of FIG. 1. As shown in FIG. 2, a plurality of bolt holes 102A1 and 102B1 are respectively formed in the first casing 102A and the second casing 102B so as to pass therethrough. The first casing 102A and the second casing 102B are structured to be joinable together by bolts 103. FIG. 2A is a view from the right side of FIG. 1, and FIG. 2B shows an example where a motor M is installed at an angle differing from that in FIG. 2A.

The input shaft 104 is located lengthways in the main body casing 102 in FIG. 1, that is, in an orthogonal direction with an axis center of the external gear (output shaft) 118, and is supported to be freely rotatable by bearings 120 and 122. A hypoid pinion (orthogonal pinion) 104A is formed at one end of the input shaft 104 (upper portion thereof in the drawing), and an insertion opening 104B, in which the output shaft (not shown) of the motor M is inserted, is formed at another end thereof.

In the main body casing 102, besides the input shaft 104, the middle shaft 108 is located parallel with the axis center of the external gear (output shaft) 118 at a position more radially outward than the internal oscillating bodies 116A and 116B. The middle shaft 108 is supported to be freely rotatable by taper roller bearings 124, 124. A hypoid gear (orthogonal gear) 128 which meshes with the hypoid pinion 104A to form the orthogonal gearset 106 is incorporated on the middle shaft 108. A middle pinion 130 is also incorporated on the middle shaft 108.

The ring-shaped transmitting external gear 110 is located at the outer circumference of the external gear (output shaft) 118 coaxially with the external gear 118 through a bearing 132. The eccentric shaft driving gears 112 incorporated with the respective three eccentric shafts 114 and the middle pinion 130 mesh concurrently with the transmitting external gear 110. That is, the transmitting external gear 110 is linked with the middle shaft 108 through the middle pinion 130, and is linked with all three of the eccentric shafts 114 through the respective eccentric shaft driving gears 112.

The three eccentric shafts 114 are located at equal intervals on the same circumference (FIG. 2), each being supported at both ends thereof by taper roller bearings 136, 136. Each of the three eccentric shafts 114 passes through eccentric holes 116A1 and 116B1 of the internal oscillating bodies 116A and 116B axially. Eccentric bodies 140A and 140B are integrally incorporated on each of the eccentric shafts 114. The phases of the eccentric bodies 140A and 140B of each of the eccentric shafts 114 are arranged so that the three eccentric shafts 114 can rotate in phase at the same time in the same direction. The two internal oscillating bodies 116A and 116B are oscillatingly rotatable by sliding with the eccentric bodies 140A and 140B while respectively maintaining a 180° phase difference mutually. An insert ring 119 is used for restricting movement axially of the two internal oscillating bodies 116A and 116B.

The external gear 118, also serving as a hollow-shaft type output shaft, internally meshes with the internal oscillating bodies 116A and 116B. The external gear 118 is a substantially tubular member having a through-hole 118D through which piping, wiring, etc. are passable, and is supported to be freely rotatable in the main body casing 102 through taper roller bearings 142, 142.

The external teeth of the external gear 118 are structured by external pins 118P which are incorporated to be freely rotatable in grooves (not shown). The number of the external pins 118P (number of the external teeth) is only slightly less than the number of the internal teeth of the internal oscillating bodies 116A and 116B (a slight difference in the number of teeth). The external gear 118 comprises three members, including a main body 118A, and end members 118B and 118C. This is for enabling incorporation and axial positioning of the taper roller bearings 142, 142 by means of step portions 118B1 and 118C1 of the end members 118B and 118C.

Operation of the planetary gear system 100 will next be explained.

The input shaft 104 rotates due to rotation of a motor shaft (not shown) of the motor M, upon which the rotational direction of the rotation is converted to an orthogonal direction through the hypoid pinion 104A and the hypoid gear 128, and first-stage reduction is carried out. Rotation is then transmitted to the middle shaft 108. With rotation of the middle shaft 108, the middle pinion 130 incorporated on the middle shaft 108 rotates, followed by rotation of the transmitting external gear 110 meshed therewith.

The eccentric shaft driving gears 112 are meshed concurrently with the transmitting external gear 110, and thus the gears 112 rotate due to rotation of the transmitting external gear 110. As a result, the three eccentric shafts 114A through 114C rotate in phase. Thus, the two internal oscillating bodies 116A and 116B oscillatingly rotate around the external gear 118 in a state of maintaining their respective phases at 180°. Since rotation of the internal oscillating bodies 116A and 116B is restricted, through one rotation of oscillating rotation of the internal oscillating bodies 116A and 116B, a phase of the external gear 110 meshed with the internal oscillating bodies 116A and 116B is shifted by the difference in the number of teeth. A rotation component equivalent to the phase difference thereof becomes the rotation of the external gear 118, and output is delivered outside.

According to the planetary gear system 100 in accordance with the embodiment of the present invention, the middle shaft 108 is located parallel to the axis center of the external gear (output shaft) 118 at a position more radially outward than the internal oscillating bodies 116A and 116B, such that rotation of the input shaft 104 is inputted to the oscillating bodies after having been received by the middle shaft 108. Therefore, the input shaft 104 (and the motor M) can be located on the radial direction side of the gear system 100, without needing to be located on the axial direction side as with the prior art. As a result, the axial length of the entire system (geared motor) including a driving source can be contained substantially within the axial length of the planetary gear system 100 itself, and the axial length can be greatly shortened. Also, when storing as stock and transporting in the form of a geared motor, there is little wasted space and handling is facilitated.

Further, an input shaft and a driving source do not exist on the axial direction side of the planetary gear system 100, and thus the external gear 118 can be designed as a large diameter hollow shaft passing through the gear system 100. The external gear 118 also serves as an output shaft, and since rotation thereof is extremely low speed, wire harnesses, cooling water piping, etc. can be directly disposed without adding features such as separate protective piping within the external gear 118.

According to the above mentioned embodiment, a structure having the insertion opening 104B for the motor shaft is employed for the input shaft 104, however, a structure may be used wherein an orthogonal pinion is formed directly on the end of the motor shaft which would then serve as the input shaft.

Also, according to the above mentioned embodiment, a set including a hypoid pinion and a hypoid gear is employed as an orthogonal pinion and orthogonal gear, however, a set including an orthogonal pinion and an orthogonal gear according to another structure such as a bevel pinion and a bevel gear may be used.

Further, the present invention is also applicable to a type of oscillating inner gearing planetary gear system where an external gear oscillates. With such an arrangement, an external gear, and not an internal gear, is oscillatingly rotated by an eccentric shaft, and the rotation component of the external gear is delivered through a carrier (or the internal gear). A structure having a plurality of eccentric shafts is also applicable.

Also, according to the above mentioned embodiment, both the middle shaft and the eccentric shafts are incorporated in the system, and eccentric bodies are incorporated on only eccentric shafts. However, an middle shaft may function as an eccentric shaft. In such arrangement, eccentric bodies may be incorporated on only the middle shaft, or, on both the middle shaft and the eccentric shaft.

Further, the present invention is also applicable in such structure that an eccentric shaft is disposed at the radial center of the gear system, as disclosed in FIG. 2 in the U.S. Pat. No. 5,222,922. Also in such arrangement, the eccentric shaft may function as an middle shaft (or an eccentric shaft may have an orthogonal gear). In a system having only one eccentric shaft, when a middle shaft functions as an eccentric shaft, the system can be miniaturized. And when an eccentric shaft has a hollow structure, a large hole can be formed at the radial center of gear system.

Thus, the present invention has a lot of variations in a structure from an input shaft to an eccentric body through a middle shaft.

Figure 3:
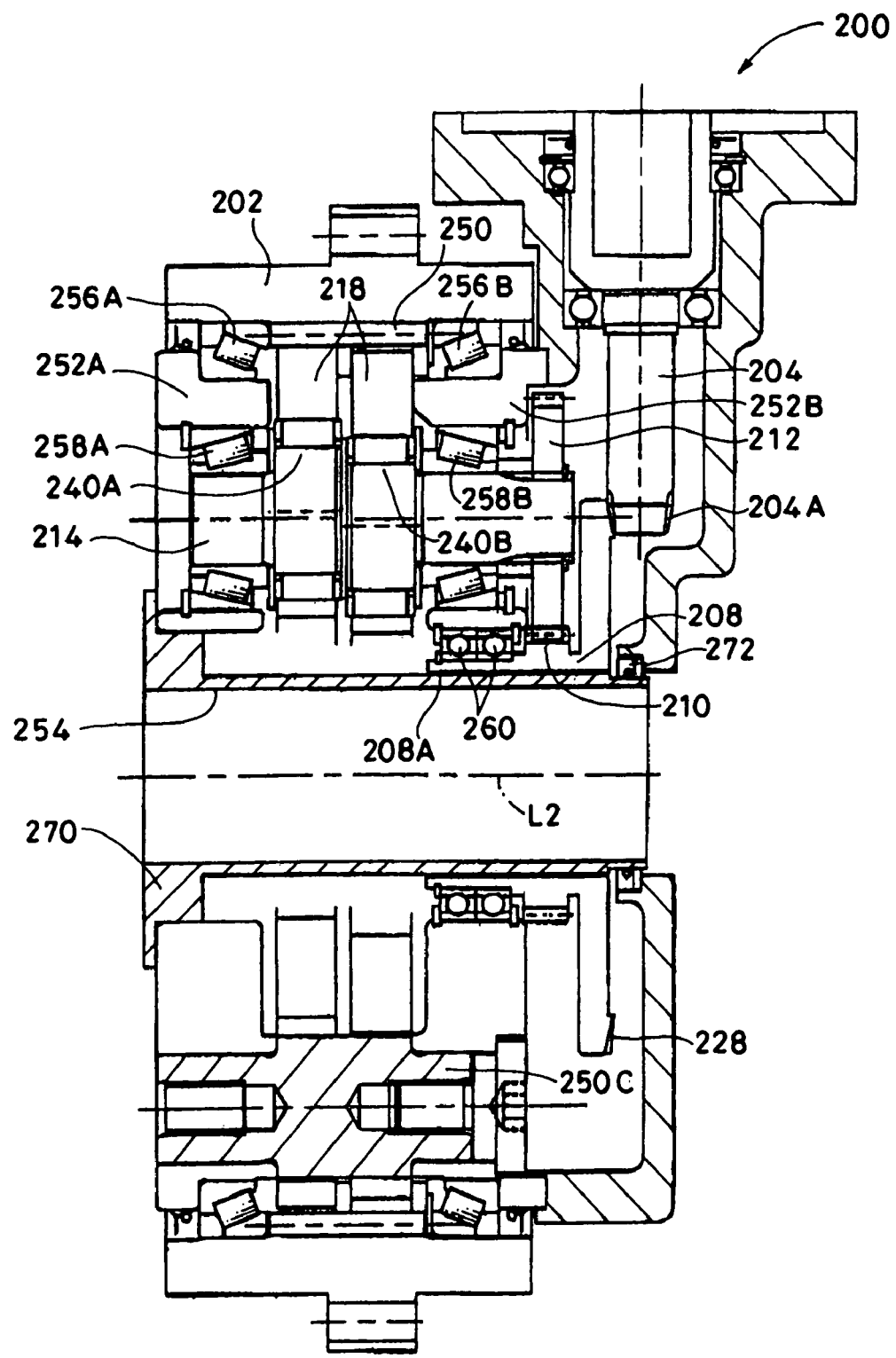
FIG. 3 is a lateral cross-sectional view showing an internal oscillating inner gearing planetary gear system according to another embodiment of the present invention.
Figure 4:
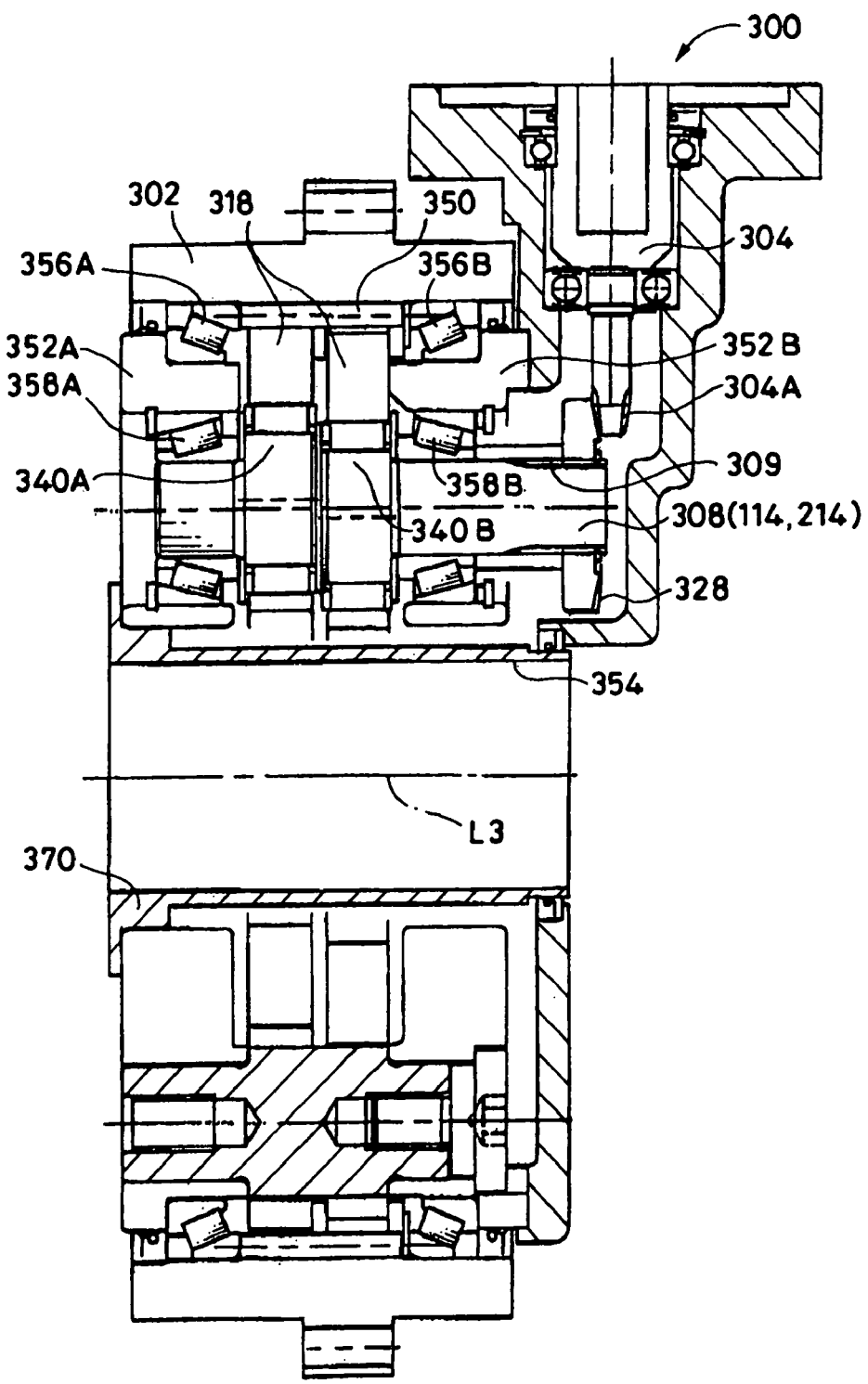
FIG. 4 is a lateral cross-sectional view showing an internal oscillating inner gearing planetary gear system according to still another embodiment of the present invention.
Figure 5:
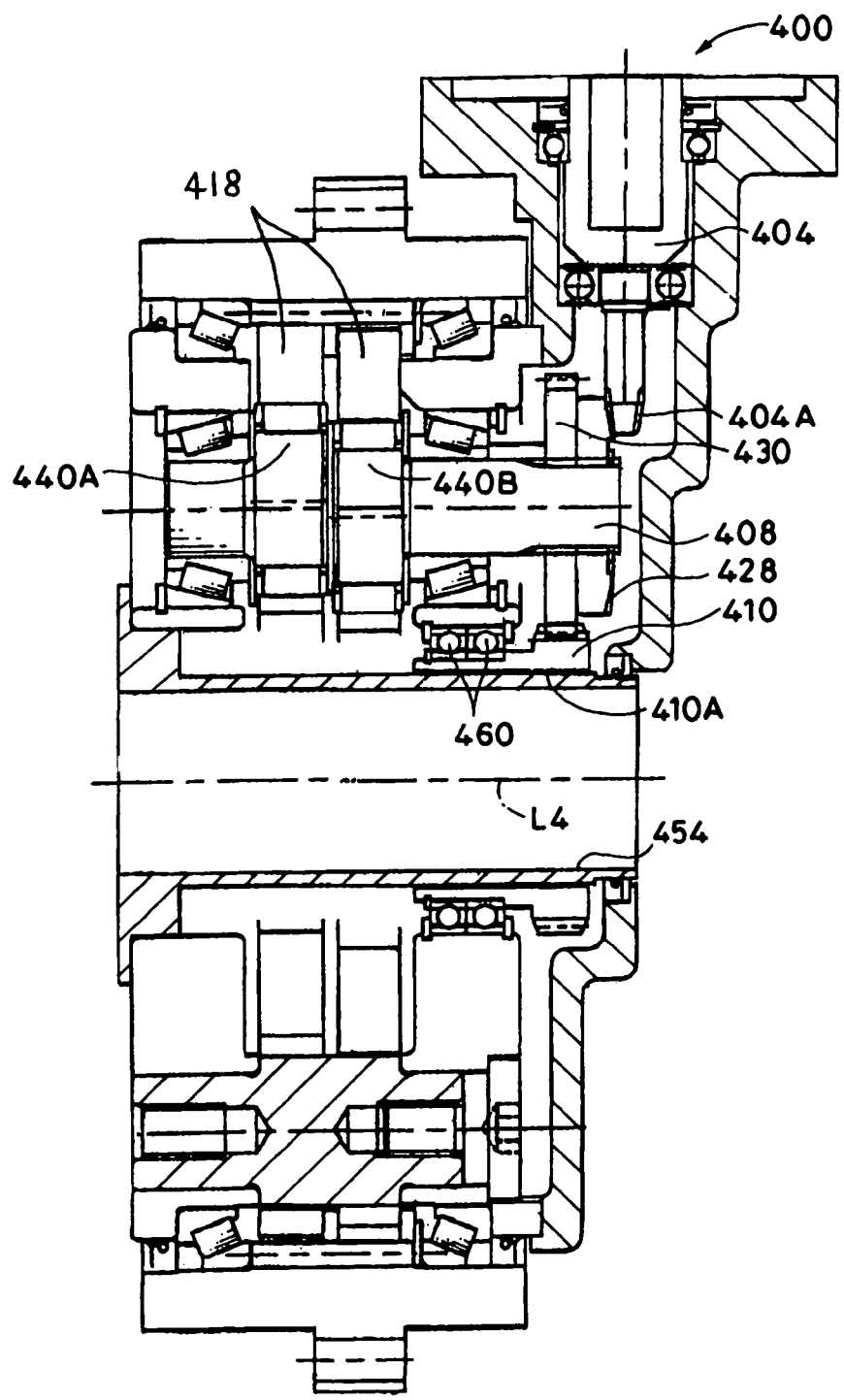
FIG. 5 is a lateral cross-sectional view showing an internal oscillating inner gearing planetary gear system according to still another embodiment of the present invention.
Figure 6:
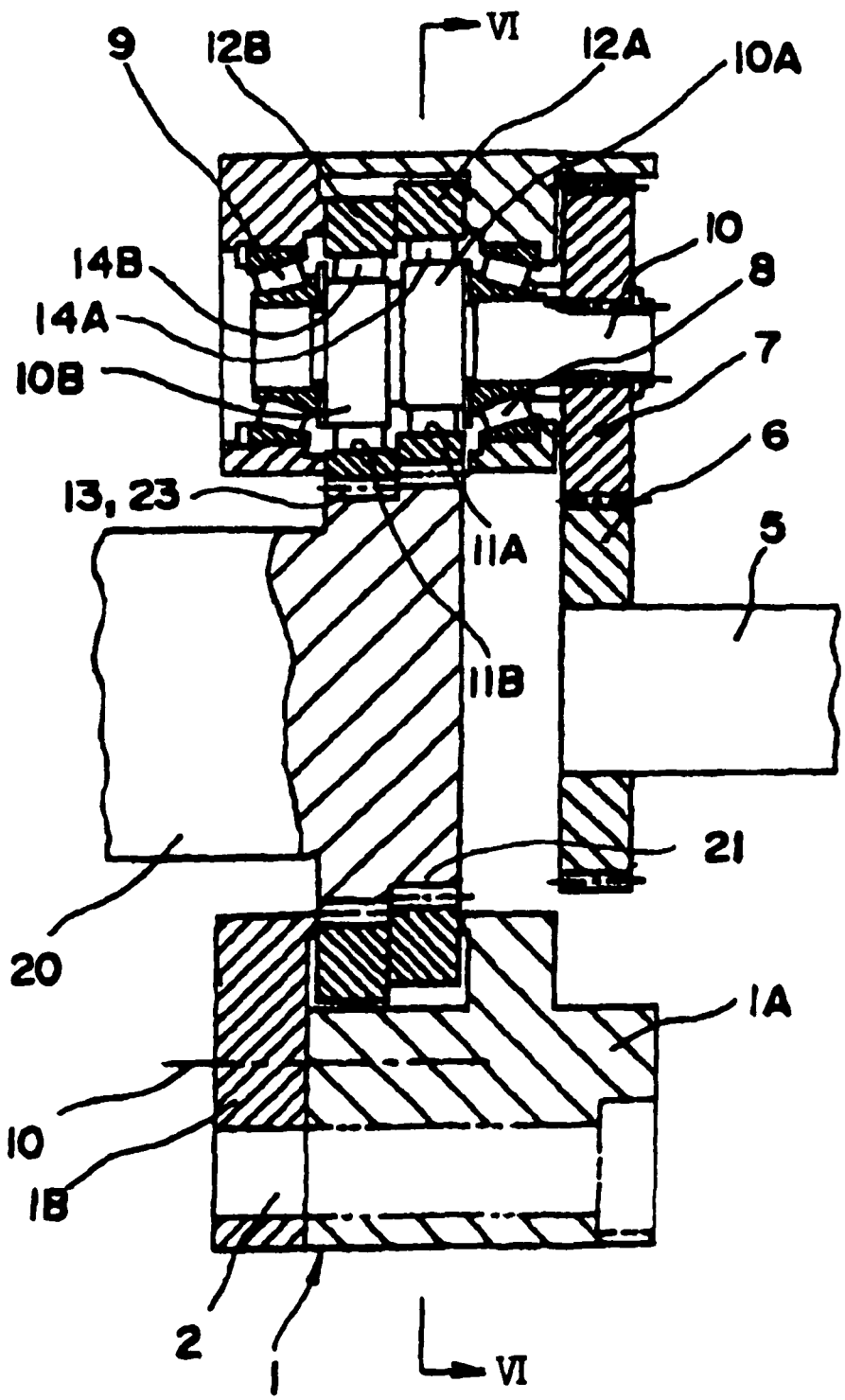
FIG. 6 is a lateral cross-sectional view showing an internal oscillating inner gearing planetary gear system according to a prior art.
Figure 7:
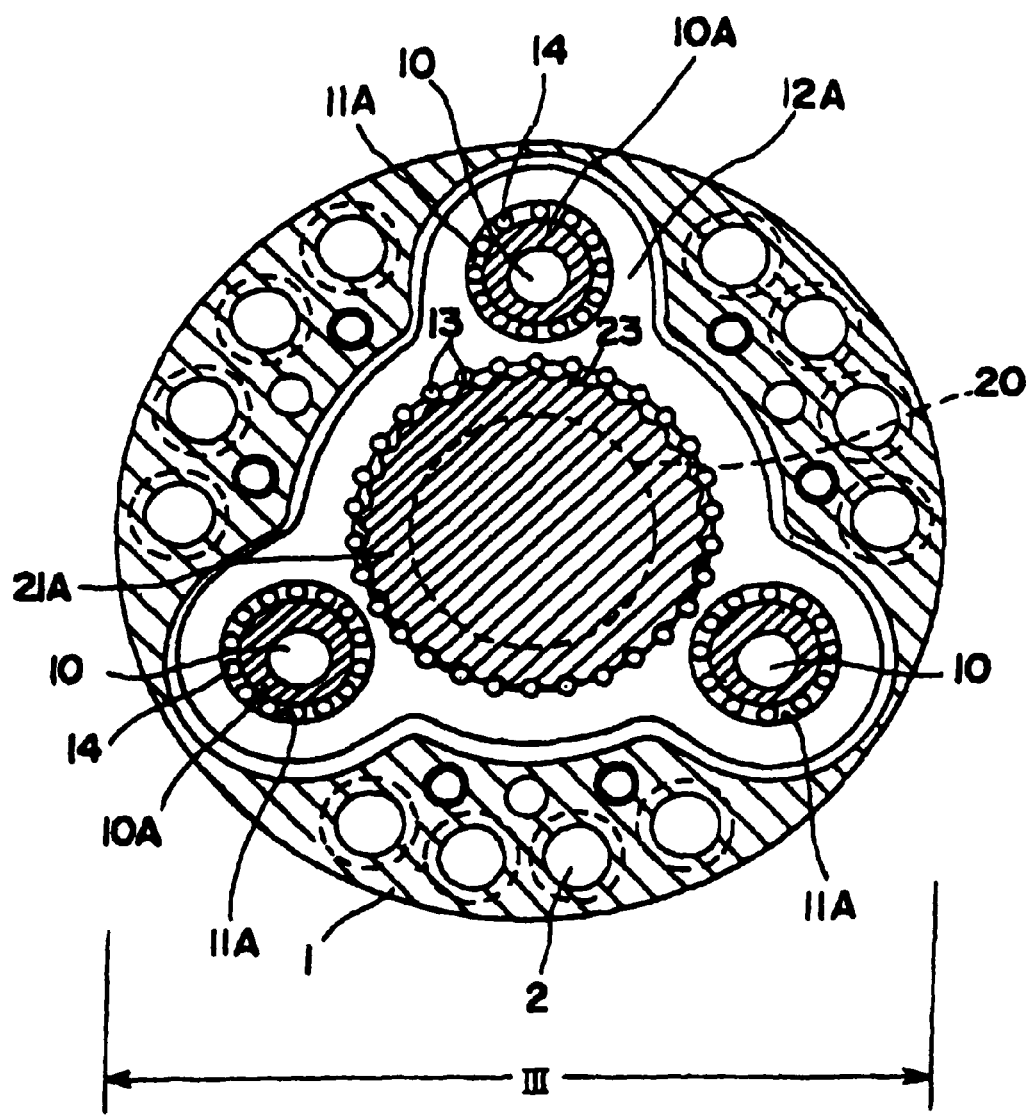
FIG. 7 is a cross-sectional view taken along the line VII-VII in FIG. 6.

FIGS. 3 to 5 show these examples. Incidentally, in the explanation of FIGS. 3 to 5, points different from the embodiment describe above are mainly explained, duplicate explanations for each figure will be omitted. The same or similar parts are designated by symbols each having same last two digits on the corresponding portions.

In a gear system 200 described in FIG. 3, external gears 218 rotate. Eccentric bodies 240A, 240B are incorporated into only eccentric shafts 214 like the previous embodiment.

In the previous embodiment, the middle shaft 108 was disposed at a position more radially outward than the internal teeth oscillating bodies (internal gear) 116A, 116B. However, in the gear system 200, a middle shaft 208 is disposed on the center axis L2 of the gear system 200. The middle shaft 208 comprises a hypoid gear (orthogonal gear) 228, and meshes with a hypoid pinion 204A formed on an input shaft 204. A transmitting gear 210 is integrally formed with the middle shaft 208.

On the other hand, three eccentric shafts (only one eccentric shaft being described in FIG. 3) 214 comprise eccentric shaft driving gears 212 respectively. The three eccentric shaft driving gears 212 mesh with the transmitting gear 210 concurrently. The eccentric shafts 214 comprise eccentric bodies 240A, 240B, and is rotatably supported by carriers 252A, 252B disposed at both axial sides of external gears 218 through bearings 258A, 258B. Carriers 252A, 252B are integrated with each other through carrier bodies 250C, and rotatably supported by a main body casing 202 through bearings 256A, 256B.

A power of the input shaft 204 is transmitted to the three eccentric shaft driving gears 212 concurrently through the hypoid pinion 204A, the hypoid gear 228, the middle shaft 208, and the transmitting gear 210. Thereby, the three eccentric shaft driving gears 212 rotate in phase so that the external gears 218 are oscillatingly rotated. When the external gears 218 are oscillatingly rotated, a relative rotation occurs, the relative rotation corresponding to a difference in the number of teeth between external gears 218 and internal gear 250 which functions as the main body casing 202. The relative rotation is transmitted to the carriers 252A, 252B which are disposed at both axial sides of external gears 218.

In the gear system, the internal gear 250 integrated with the main body casing 202 can be fixed so that the carriers 252A, 252B function as an output member (output flange). Also, the main body casing 202 can function as an output member while the carriers 252A, 252B are fixed.

In the gear system, the middle shaft 208 is supported by the carrier 252B through the bearing 258 at the radial center of the gear system 200 in a cantilever state. The middle shaft 208 comprises a through hole 208A having a large diameter so that the gear system 200 can have a large through hole 254 around an axis center L2 (hollow structure).

A symbol 270 designates a center pipe. The center pipe 270 is mounted on the carrier 252A at its one end, and supported through an oil seal 272 at the other end. The center pipe 270 prevents a wire harness or a pipe passing therethrough (not shown) from contacting directly with the middle shaft 208 or the like which rotates at high speed.

When the carrier 253A functions as an output member, the center pipe 270 rotates slowly with the carrier 252A. when the main body casing 202 functions as an output member, the center pipe 270 maintains a fixed state with the carrier 252A. therefore, various things can be disposed in the hole 254 of the gear system 200 without interfering with each member of gear system 200.

FIG. 4 shows an example of a structure that a middle shaft functions as an eccentric shaft. In the structure in FIG. 4, an external gear oscillatingly rotates. Therefore, the example of FIG. 4 has a lot of similar structure, then, a difference from that of FIG. 3 is mainly explained. The symbols each having same last two digits will be given to parts corresponding to that of FIG. 3, and duplicate explanation will be omitted properly.

In the gear system 300 described in FIG. 4, a hypoid pinion 304A formed on the tip of an input shaft 304 meshes with a hypoid gear (orthogonal gear) 328 mounted on a middle shaft 308 through a spline 309. The hypoid gear 328 functions as the eccentric shaft driving gears 112 in the previous embodiment. Eccentric bodies 340A, 304B are directly attached to the middle shaft 308. Namely, the middle shaft 308 corresponds to an eccentric shaft (114 or 214) in the previous embodiment, and functions as an eccentric shaft. A power of the input shaft is transmitted to the middle shaft 308. The external gears 318 are driven by the middle shaft 308.

Although not shown, in the gear system 300, eccentric shafts having eccentric bodies are disposed at two positions in the direction of the circumference. However, the eccentric shafts do not function as middle shafts, and do not linked with the middle shaft 308. that is, the remaining two eccentric shafts in this embodiment are driven by the external gear 318 so as to support the external gear 318 stably.

The gear system 300 has no member around axis L3 which interferes with formation of a hole, so that a hollow structure having a large hole 354 can be constructed.

In an example described in FIG. 5, external gears rotate. Also in a gear system 400, a middle shaft 408 serves as an eccentric shaft, and the gear system 400 has two eccentric shafts (not shown) on which the eccentric bodies are mounted. However, this middle shaft 408 and all other two eccentric shafts contribute to drive an external gear 418.

Hypoid pinion 404A formed at the tip of the input shaft 404 meshes with the hypoid gear (orthogonal gear) 428 mounted on the middle shaft 408. This hypoid gear 428 has a function as an eccentric shaft driving gear, and the middle shaft 408 has a function as an eccentric shaft like the previous middle shaft 308. That is, also in the gear system 400, the middle shaft 408 functions directly as an eccentric shaft.

A middle pinion (middle gear) 430 is disposed on the middle shaft 408, and meshes with a transmitting gear 410. As mentioned above, two more eccentric shafts which are not illustrated are prepared in this gear system 400. Eccentric shaft driving gears (which correspond to the gear 112 in the previous embodiment) are respectively mounted on each eccentric shaft. These eccentric shaft driving gears also meshes with the transmitting gear 410. thus, in the gear system, all eccentric shaft including middle shaft 408 contribute to the drive of oscillating rotation of the external gear 418.

The transmitting gear 410 is supported by bearings 460 in a cantilever state. A disposed position and a state of support are similar to the middle shaft 208 of the gear system in FIG. 3. However, the transmitting gear 410 is a gear having a function for distributing the power inputted from input shaft 404 side to each eccentric shaft. Therefore, the transmitting gear 410 does not correspond to middle shaft designated in the present invention.

The transmitting gear 410 comprises a hole 410A having a large diameter so that the gear system 400 comprises a hollow structure having a large hole around a center axis L4 of the gear system.

The invention claimed is:

1. An oscillating inner gearing planetary gear system, comprising:
   an internal gear;
   an external gear that is meshed with the internal gear;

an eccentric body configured to oscillatingly rotate either the internal gear or the external gear;

an input shaft; and a middle shaft having an orthogonal gear, the orthogonal gear linking the middle shaft to the input shaft at a right angle, wherein either the internal gear or the external gear is configured to be oscillatingly rotated via the input shaft, the orthogonal gear, the middle shaft and the eccentric body, and the eccentric body is configured to be integrally rotated with the middle shaft.

2. The oscillating inner gearing planetary gear system according to claim 1, further comprising:

an eccentric shaft comprising an eccentric body different from the eccentric body that is configured to be integrally rotated with the middle shaft, wherein the eccentric shaft is disposed apart from the middle shaft.

3. The oscillating inner gearing planetary gear system according to claim 2, wherein the eccentric shaft is not linked with the middle shaft.

4. An oscillating inner gearing planetary gear system, comprising:

an internal gear;

an external gear that is meshed with the internal gear;

an eccentric body configured to oscillatingly rotate either the internal gear or the external gear;

an input shaft;

a middle shaft having an orthogonal gear, the orthogonal gear linking the middle shaft to the input shaft at a right angle, wherein either the internal gear or the external gear is configured to be oscillatingly rotated via the input shaft, the orthogonal gear, the middle shaft and the eccentric body, and the eccentric body is configured to be integrally rotated with the middle shaft;

an eccentric shaft comprising an eccentric body different from the eccentric body that is configured to be integrally rotated with the middle shaft, wherein the eccentric shaft is disposed apart from the middle shaft;

eccentric shaft drive gears incorporated into the middle shaft and the eccentric shaft, respectively; and a transmitting gear that is meshed with all of the eccentric shaft drive gears.

5. The oscillating inner gearing planetary gear system according to claim 4, wherein the transmitting gear comprises a hollow structure.

6. The oscillating inner gearing planetary gear system according to claim 1, wherein the eccentric body is configured to oscillatingly rotate the external gear and the output member comprises a hollow shaft.

* * * * *